United States Patent
McGlasson et al.

(10) Patent No.: US 7,553,115 B2
(45) Date of Patent: Jun. 30, 2009

(54) GEAR TESTING AND LAPPING MACHINE

(75) Inventors: William D. McGlasson, Caledonia, NY (US); Daniel D. Wood, Macedon, NY (US); David E. Lawson, Webster, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 11/899,459

(22) Filed: Sep. 6, 2007

(65) Prior Publication Data

US 2008/0056837 A1    Mar. 6, 2008

Related U.S. Application Data

(60) Provisional application No. 60/842,500, filed on Sep. 6, 2006.

(51) Int. Cl.
*B23F 9/10* (2006.01)
(52) U.S. Cl. .............................. 409/27; 451/47; 451/253
(58) Field of Classification Search ................... 409/25, 409/27, 28, 29, 33, 43, 61, 137, 185, 190, 409/191, 197, 224, 225, 26; 73/162; 451/47, 451/253; *B23F 9/10, 9/14*
See application file for complete search history.

(56) References Cited

U.S. PATENT DOCUMENTS

| | | | | |
|---|---|---|---|---|
| 3,054,332 A | * | 9/1962 | Male ........................... | 409/53 |
| 3,099,939 A | * | 8/1963 | Haase et al. .................. | 409/25 |
| 3,110,225 A | * | 11/1963 | Carlsen et al. ................ | 409/51 |
| 3,464,312 A | * | 9/1969 | Hanzawa et al. .............. | 409/29 |
| 4,981,402 A | * | 1/1991 | Krenzer et al. ................ | 409/26 |
| 5,116,173 A | * | 5/1992 | Goldrich ...................... | 409/13 |
| 5,139,005 A | * | 8/1992 | Dodd ........................ | 125/11.01 |
| 5,662,439 A | * | 9/1997 | Reese et al. ................... | 409/61 |
| 5,800,103 A | * | 9/1998 | Stadtfeld et al. .............. | 409/27 |
| 5,961,260 A | | 10/1999 | Kasler et al. | |
| 6,182,506 B1 | * | 2/2001 | Hoikkala ..................... | 409/61 |
| 6,712,566 B2 | * | 3/2004 | Stadtfeld et al. .............. | 409/26 |
| 6,880,214 B2 | | 4/2005 | Stüdemann et al. | |

FOREIGN PATENT DOCUMENTS

| | | |
|---|---|---|
| DE | G 8316776 | 11/1983 |
| DE | 19646189 | 5/1998 |
| WO | WO 97/01749 | 1/1997 |

OTHER PUBLICATIONS

International Search Report and Written Opinion of the ISA for PCT/US2007/019468.

* cited by examiner

*Primary Examiner*—Daniel W Howell
(74) *Attorney, Agent, or Firm*—Robert L. McDowell

(57) ABSTRACT

A machine for processing gears, such as by testing and lapping, which can accommodate a wide range of gear pair shaft angles (less than, equal to, and greater than ninety degrees) while providing improved machine stiffness and an enhanced arrangement of machine elements.

22 Claims, 3 Drawing Sheets

GEAR TESTING AND LAPPING MACHINE

This application claims the benefit of U.S. Provisional Patent Application No. 60/842,500 filed Sep. 6, 2006, the entire disclosure of which is hereby incorporated by reference.

FIELD OF THE INVENTION

The present invention is directed to an apparatus for processing gears, in particular testing or lapping of gears such as bevel or cylindrical gears.

BACKGROUND OF THE INVENTION

Lapping is a well established process for finishing the tooth surfaces of bevel gears. It is a process that provides an economical alternative to other hard finishing processes for many applications of bevel gears. In testing, a pair of gears are rolled together and their rolling characteristics, such as radial and/or axial runout, meshing noise and contact pattern position, are determined and analyzed.

In the lapping process, a pinion and ring gear are mounted, via appropriate workholding equipment, to respective spindles in a lapping machine. In most instances of rolling of the gearset, the pinion is the driving member and the ring gear is braked. The gears are rolled in mesh and lapping compound or slurry, which can be a mixture of oil (or water) and silicon carbide or similar abrasive, is poured into the meshing zone. Testing machines generally have the same configuration as lapping machines although no abrasive material is utilized with a testing machine.

Most lapping and testing machines have three degrees of freedom available for realizing relative motion between a ring gear and pinion. The first freedom being relative movement in the direction of the ring gear axis which shall be referred to as direction G, the second freedom being relative movement in direction of the pinion axis which shall be referred to as direction H, and the third degree of freedom being distance between the ring gear and pinion axes which shall be referred to as direction V. The direction V is also known as the "hypoid offset." While many lapping or testing machines have ring gear and pinion axes arranged with a fixed shaft angle of 90° with respect to one another, machines are also known in which the shaft angle between the ring gear and pinion is adjustable.

In lapping or testing processes, relative movement in the V and H directions effect positional changes in the contact pattern of the members of the gearset, in effect modifying the contact pattern. Lapping involves rotating the gear members in mesh with contact at a desired position on the tooth surfaces. Thus, the members are located at particular V and H positions along with a particular G direction position to effect the desired backlash.

Typically, the V, H and G movements each have an effect on both the lengthwise and depthwise position of the localized tooth contact pattern. As a gear set is lapped, contact is shifted toward one of the outer (heel) or inner (toe) portions of the tooth surface by changing the V and H settings as necessary to effect such a shifting of the contact position. As V and H are changed to effect the shifting, the G direction position must also be changed to maintain the desired backlash. When the desired heel or toe position is reached, V and H positions are again changed to shift contact to the other of the heel or toe positions with the changing V and H positions being accompanied by an appropriate G direction change to maintain backlash. The contact position is then returned to the beginning position.

SUMMARY OF THE INVENTION

The present invention provides a machine, for example a testing or lapping machine, for processing gears which can accommodate a wide range of gear pair shaft angles while providing improved machine stiffness and an enhanced arrangement of machine elements.

DETAILED DESCRIPTION OF THE PREFERRED EMBODIMENT

The details of the present invention will now be discussed with reference to the accompanying drawings which represent the invention by way of example only. The present invention will be discussed and illustrated with respect to a gear testing machine as a preferred embodiment. However, the discussed details are likewise applicable to other gear processing machines such as gear lapping, cutting and grinding machines. In all drawings and for discussion purposes, the illustrated machine is positioned on a horizontal surface.

Figure 1:
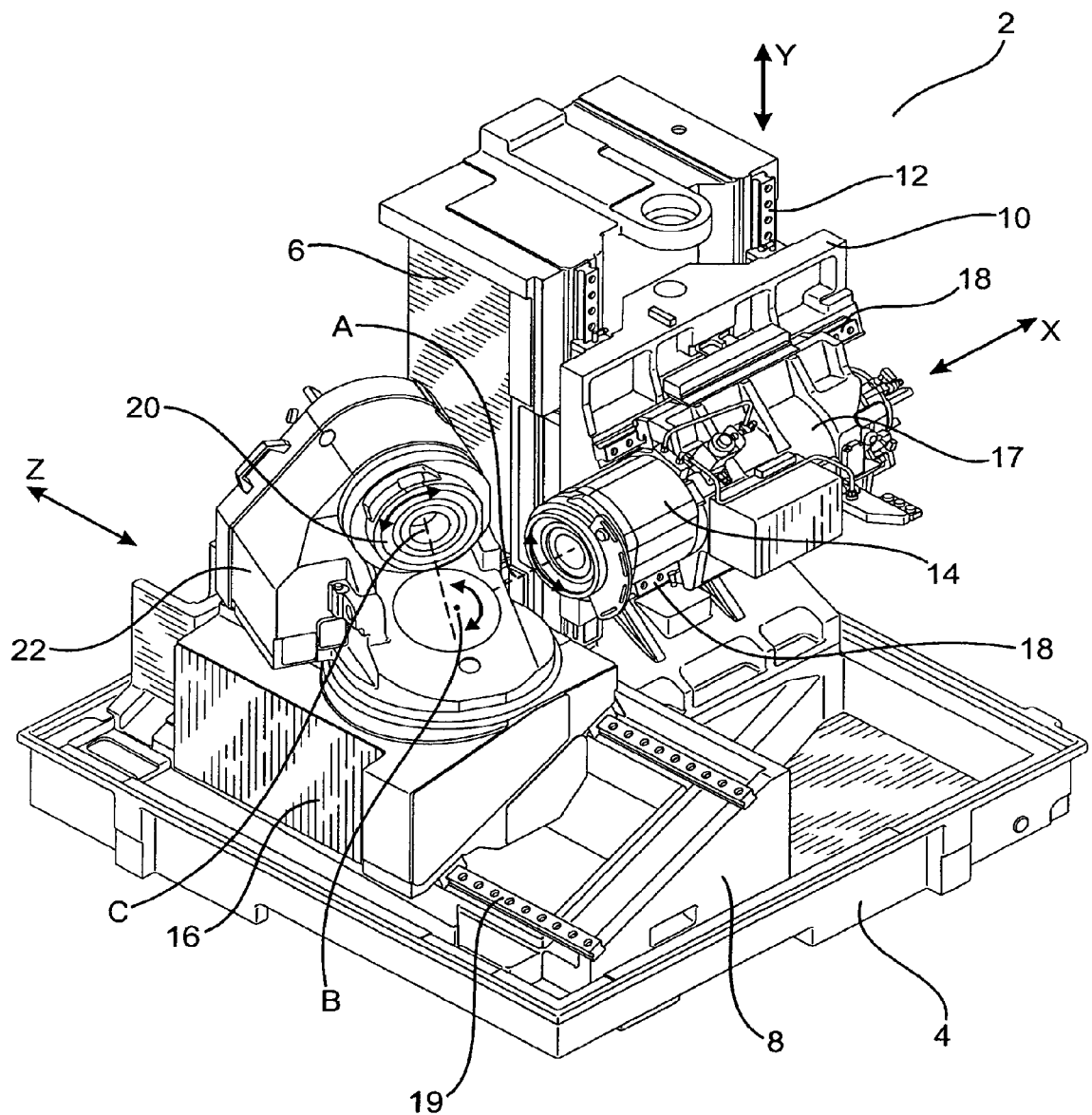
FIG. 1 illustrates the inventive machine with the spindles oriented at less than 90°.

FIG. 1 illustrates a gear testing machine 2 having a base portion 4 which is integral with a stationary column 6. The column 6 may be secured to the base 4 by means such as bolts or by welding, or the column 6 and base 4 may be formed as a one-piece unit such as by casting. Base 4 and/or column 6 may be made of metal such as cast iron or steel plates, or they may be made of a non-metal substance such as a cast mineral aggregate. Base 4 also includes an inclined bed portion 8 that preferably is cast as part of the base 4 but may be attached to the base 4 in a manner similar to that of the column 6. Preferably, column 6 is also attached to inclined bed portion 8 for improving machine stiffness.

A first slide 10 is arranged for up and down (Y-axis) movement on column 6 via at least one guide (e.g. rails) 12. A first spindle 14 is arranged on slide 10 via a spindle support carriage 17. Spindle 14 is capable of horizontal (X-axis) movement on slide 10 via at least one guide (e.g. rails) 18. Spindle 14 is rotatable about spindle axis A and may be pivotable about a vertical axis although, preferably, spindle 14 is not pivotable.

A second slide 16 is arranged for horizontal (Z-axis) movement on inclined bed portion 8 via at least one guide (e.g. rails) 19. A second spindle 20 is positioned in a spindle support carriage 22 located on slide 16. Spindle 20 and carriage 22 are preferably pivotable about a pivot axis B. Spindle 20 is rotatable about spindle axis C. Preferably, axes X, Y and Z are perpendicular with respect to one another but this is not mandatory. One or more of the axes may be inclined from the perpendicular arrangement. Preferably, pivot axis B is vertical. Spindles 14 and 20 may both be direct driven spindles, belt driven spindles or a combination thereof.

The non-turret design of spindle 20 and carriage 22 enables the pivot axis B to be near the mesh point of a gear pair during testing or lapping. Preferably, pivot axis B is located on the spindle 14 side of the axis C (when viewed with axes A and C positioned at 90° with respect to one another). Such an arrangement minimizes the range of linear axes travel and increases positional accuracy. Additionally, carriage 22 may include an outboard support, preferably mounted to table 23, for instances where additional support is needed such as with ring gears mounted to differential case assemblies. The outboard support may be rotatable down and away from spindle 20 when not in use or for loading and unloading of a gear pair member, usually the ring gear.

Movement of first spindle 14 in the X-axis direction, second spindle 20 in the Z-axis direction, slide 10 in the Y-axis direction, pivoting of spindle 20 about pivot axis B, as well as first spindle rotation about the A-axis and second spindle rotation about the C-axis, is imparted by the separate drive motors (not shown). The above-named components are capable of independent movement with respect to one another or may move simultaneously with one another. Each of the respective motors is associated with a feedback device such as a linear or rotary encoder (not shown) as part of a CNC system which governs the operation of the drive motors in accordance with instructions input to a computer controller such as the Fanuc model 180i.

Figure 2:
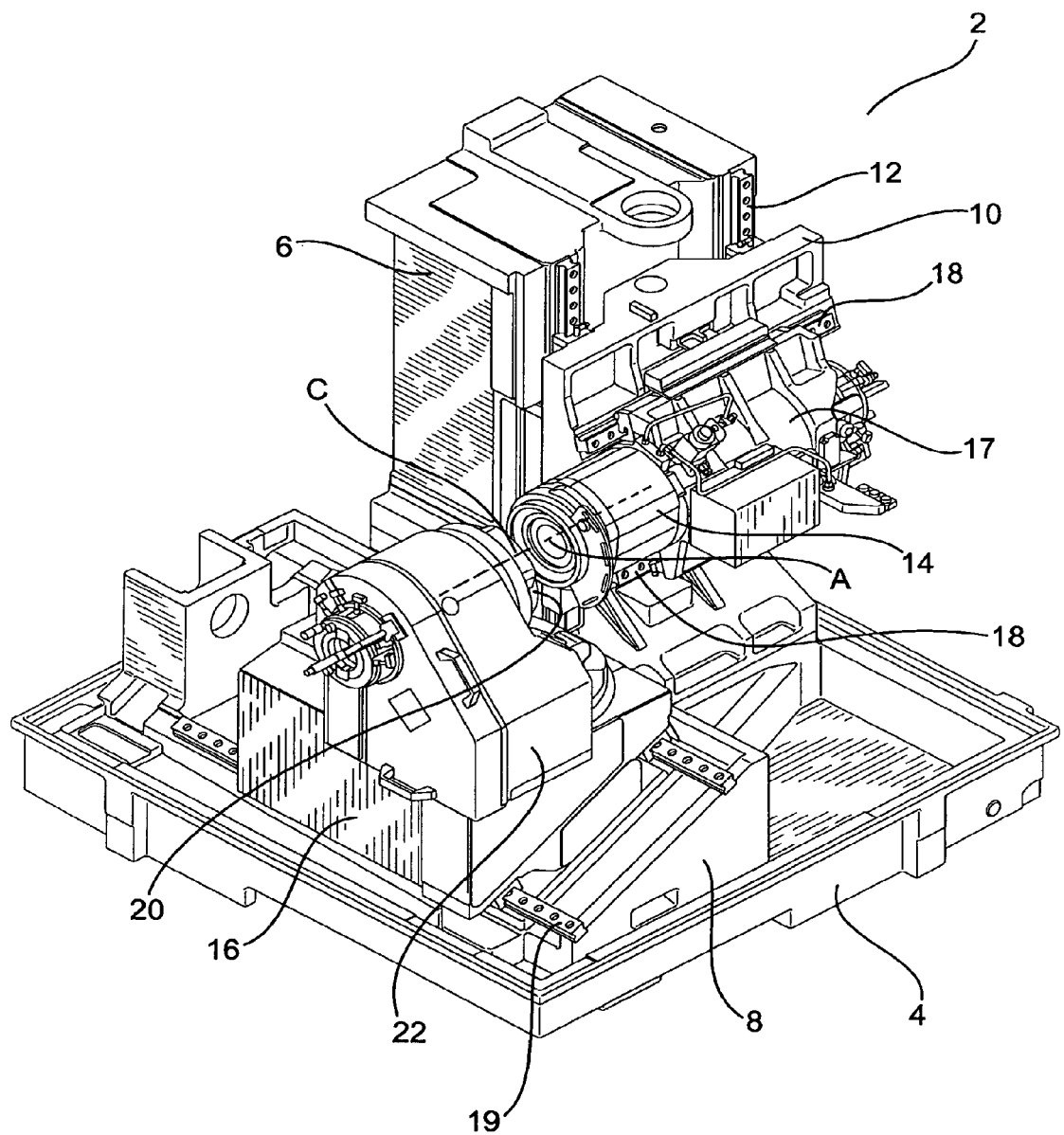
FIG. 2 illustrates the inventive machine with the spindles oriented at 180°.

While many testing or lapping machines for bevel gears are constructed such that the angle between the spindle axes is 90° (the shaft angle of most pairs of bevel gears), the present invention provides for pivoting of the spindle 20 such that a wide range of shaft angles may be accommodated. For example, FIG. 1 illustrates an angle between the A-axis and the C-axis of less than 90° (for example, 65°) while FIG. 2 shows the same machine with the A-axis and C-axis positioned at 180° with respect to one another. The latter arrangement (i.e. 180°) being suitable for testing or lapping of cylindrical gears (e.g. spur or helical gear pairs) whose axes usually are arranged at 180° with respect to one another. The present machine also contemplates angles between the A and C axes in excess of 180°, for example 185° or more.

Figure 3:
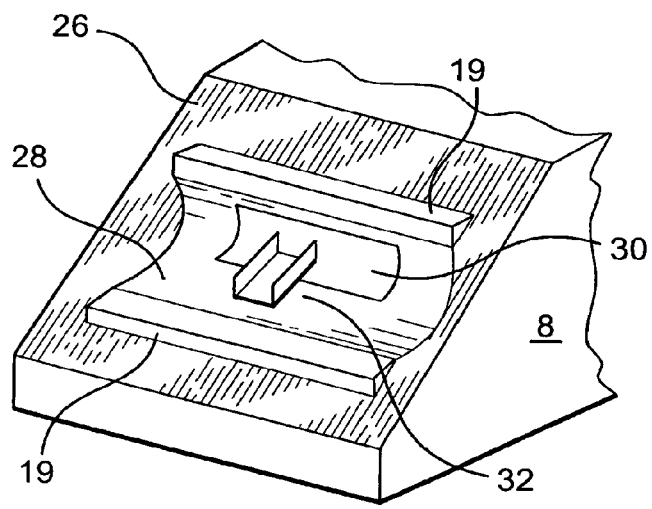
FIG. 3 is a front view of a groove and conduit in the inclined bed portion of the machine base.
Figure 4:
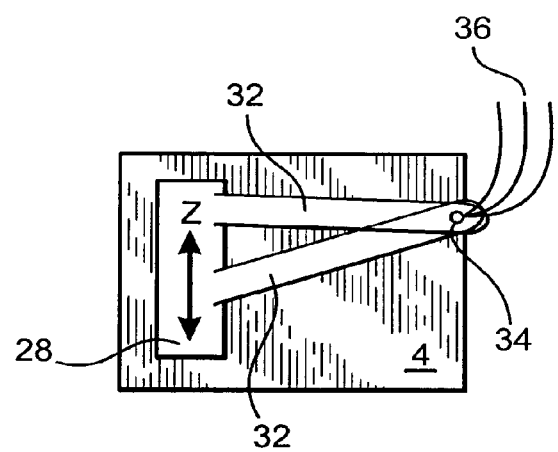
FIG. 4 is a top view of the machine base illustrating the pivoting of the conduit.
Figure 5:
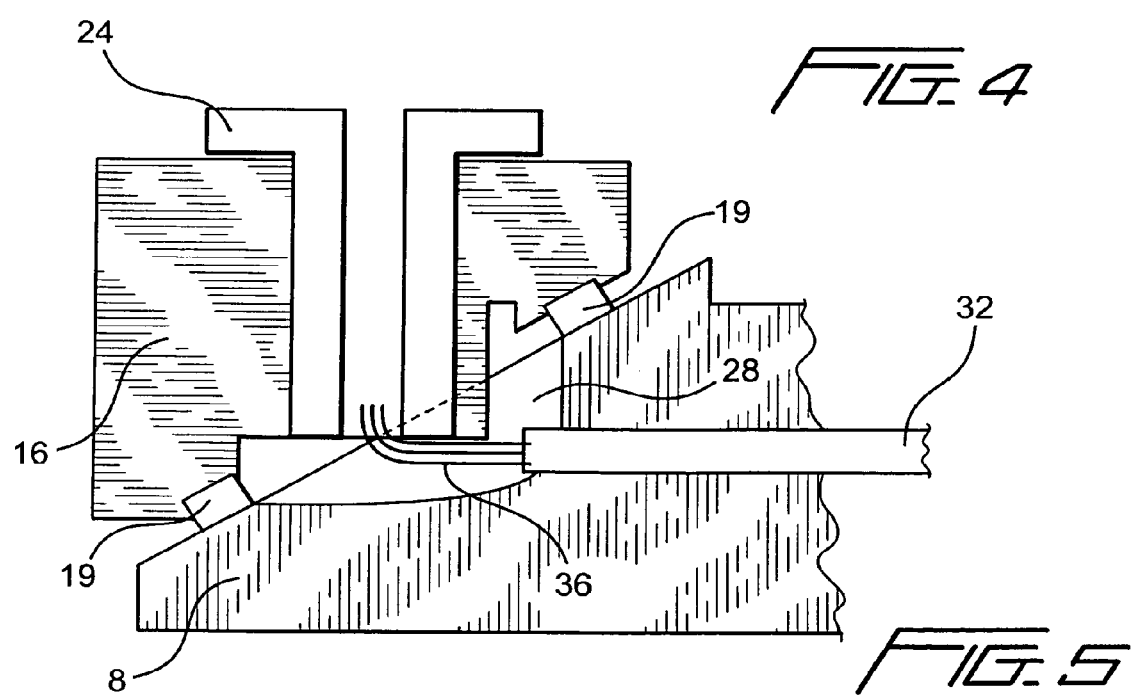
FIG. 5 is a side view of the inclined bed portion of the machine base showing the conduit in communication with the groove.

In FIG. 3 it can be seen that inclined bed portion 8 includes an inclined surface 26 in which a groove or channel 28 is located. Groove 28 may be machined into the surface 26 or may be formed when the inclined bed portion 8 is initially manufactured, such as by casting. The groove 28 includes an opening 30 through which a pivoting conduit 32, such as a pipe or trough, extends. Conduit 32 is located in the machine base 4 and extends from a location proximate an outside surface of the machine base 4 (e.g. opposite the opening 30) to the opening 30 in the groove 28. Items 36 (wires, tubes, etc.) necessary to communicate with the spindle 20 for its operation (including pivoting) may be directed through the conduit, via an opening in the pivot spindle 24 for example, to the spindle 20 (FIG. 5). The conduit 32 is pivotable as shown, for example at 34, and is connected to the slide 16 such that when slide 16 is moved in the direction of the Z axis, conduit 32 will move within the opening 30 of groove 28 to follow the movement of the slide 16 thus maintaining communication of the items 36 with the spindle 20. With wires, tubes, etc. being routed to the spindle 20 via conduit 32, visibility in the work area of the machine is enhanced.

The inventive machine also preferably includes placement of a ballscrew (not shown) for moving spindle 14 and carriage 17 in the X direction at a location between the spindle 14 and column 6 but below the center of spindle 14. For example, when viewed from the rear of the spindle 14 and carriage 17, the ballscrew would be located at the 5 o'clock position instead of the conventional 3 o'clock position.

Additionally, upper and lower X-direction rails 18 are preferably arranged in an inclined manner with the upper rail being positioned closer to the column 6 than the lower rail. With the described ballscrew and rail arrangements, a decrease in spindle overhang with respect to the Y-direction rails is realized and appropriate space is created such that, if desired, a belt driven motor for driving the spindle 14 may be positioned closer to the column 6 than would be possible if rails 18 were equidistant from column 6. The top surfaces of rails 18 and/or 19 may be oriented generally parallel (see 19 in FIG. 5 for example) with respect to the angular inclination of bed portion 8 and/or slide 10, or, the top surfaces of rails 18 and/or 19 may oriented in a horizontal manner such as exemplified by 19 in FIG. 3.

In testing or lapping, a ring gear is preferably positioned in spindle 20 and a pinion is positioned in spindle 14 via conventional workholding equipment. As stated above, the first freedom of motion in lapping or testing is relative movement in the direction of the ring gear axis C (known as direction G), which will be in the direction of the Z axis with gear pair members having a 90° shaft angle but which will require coordinated motions in the directions of the X and Z axes when shaft angles other than 90° exist. The second freedom is relative movement in direction of the pinion axis A (known as direction H) which will be in the direction of the X axis. The third degree of freedom is the distance between the ring gear and pinion axes (known as direction V) which is in the direction of the Y axis.

It should be understood that when lapping gears on the described machine, appropriate shielding or covering of rails, spindles, table and any other components adversely affected by the abrasive lapping compound must be provided. A sealed lapping chamber for the gear pair members may be utilized. If desired, first spindle 14 and second spindle 20 may be oriented with respect to one another in a fixed manner (i.e. neither are pivotable) such that the X-axis and Z-axis extend perpendicular (i.e. oriented at 90 degrees) with respect to one another thereby enabling processing of gears pair members at a fixed 90° orientation.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A gear processing machine comprising:
   a base portion integral with a stationary column extending upward from said base portion;
   a first spindle movably mounted to said column, said first spindle having an axis of rotation;
   a stationary inclined bed portion located on said base portion, said inclined bed portion being attached to said column;
   a second spindle movably mounted to said inclined bed portion, said second spindle having an axis of rotation;
   said first spindle and said second spindle being translatable with respect to one another in up to three different directions.

2. The gear processing machine of claim 1 further including:
   at least one of said first spindle and said second spindle being angularly movable with respect to one another around at least one pivot axis whereby said first spindle axis and said second spindle axis are positionable with respect to one another to effect processing of gear pair members at predetermined angles with respect to one another, said angles being at least one of less than, equal to, or greater than ninety degrees.

3. The gear processing machine of claim 1 further comprising a movable first slide positioned between said column and said first spindle.

4. The gear processing machine of claim 3 wherein said first slide is movable in a first of said three different directions.

5. The gear processing machine of claim 3 wherein said first spindle is movable in a second of said three different directions.

6. The gear processing machine of claim 1 further comprising a movable second slide positioned between said inclined base portion and said second spindle.

7. The gear processing machine of claim 6 wherein said second spindle is located in a support carriage with said support carriage being positioned on and angularly movable with respect to said second slide.

8. The gear processing machine of claim 7 wherein said carriage includes an outboard support.

9. The gear processing machine of claim 6 wherein said second slide is movable in a third of said three different directions.

10. The gear processing machine of claim 2 wherein only said second spindle is angularly movable about a pivot axis.

11. The gear processing machine of claim 2 wherein said at least one pivot axis is vertically oriented.

12. The gear processing machine of claim 1 wherein said three different directions are perpendicular with respect to one another.

13. The gear processing machine of claim 2 wherein said second spindle is angularly movable about a pivot axis with said pivot axis being positioned between said first spindle and the axis of said second spindle as referenced when the axes of the first and second spindles are oriented at 90 degrees with respect to one another.

14. The gear processing machine of claim 6 further comprising:
said inclined bed portion having an inclined surface with an opening therein;
a pivotable conduit having a first end extending from a location proximate an outside surface of said machine and a second end extending through said opening, said second end of said conduit being movable in said opening whereby said conduit will follow the movement of said second slide.

15. The gear processing machine of claim 1 wherein said first spindle is movable in a horizontal direction, X, relative to said column via a ballscrew positioned between said first spindle and said column and below the center of said first spindle.

16. The gear processing machine of claim 3 wherein said first spindle is movably positioned on said first slide via an upper rail and a lower rail, said upper rail being positioned closer to said column than said lower rail.

17. A gear testing or lapping machine comprising:
a base portion integral with a stationary column extending upward from said base portion;
a first slide positioned on said column, said first slide being movable in a first vertical direction, Y;
a first spindle movably positioned on said first slide, said first spindle being movable in a first horizontal direction, X, and having an axis of rotation, A;
a stationary inclined bed portion located on said base portion, said inclined bed portion being attached to said column;
a second slide positioned on said inclined bed portion, said second slide being movable in a second horizontal direction, Z;
a second spindle movably mounted to said second slide, said second spindle having an axis of rotation, C;
said second spindle being angularly movable around a pivot axis, B, whereby said first spindle axis, A, and said second spindle axis, C, are positionable with respect to one another to effect testing or lapping of gear pair members at predetermined angles with respect to one another, said angles being at least one of less than, equal to, and greater than ninety degrees with respect to one another.

18. The gear testing or lapping machine of claim 17 wherein directions X, Y and Z are perpendicular with respect to one another.

19. The gear testing or lapping machine of claim 17 wherein said pivot axis is positioned between said first spindle and the axis of said second spindle as referenced when the axes of the first and second spindles are oriented at 90 degrees with respect to one another.

20. The gear testing or lapping machine of claim 17 further comprising:
said inclined bed portion having an inclined surface with an opening therein;
a pivotable conduit having a first end extending from a location proximate an outside surface of said machine and a second end extending through said opening, said second end of said conduit being movable in said opening whereby said conduit will follow the movement of said second slide.

21. The gear testing or lapping machine of claim 17 wherein said first spindle is movable in horizontal direction, X, relative to said column via a ballscrew positioned between said first spindle and said column and below the center of said first spindle.

22. The gear testing or lapping machine of claim 17 wherein said first spindle is movably positioned on said first slide via an upper rail and a lower rail, said upper rail being positioned closer to said column than said lower rail.

* * * * *